United States Patent
Fieldman

(10) Patent No.: US 12,153,762 B1
(45) Date of Patent: Nov. 26, 2024

(54) METHOD OF ADJUSTING VIRTUAL KEYBOARDS AND INTERFACES BASED ON USER HEIGHT

(71) Applicant: VR-EDU, Inc., Gainsville, FL (US)

(72) Inventor: Ethan Fieldman, Gainsville, FL (US)

(73) Assignee: VR-EDU, INC., Gainesville, FL (US)

( * ) Notice: Subject to any disclaimer, the term of this patent is extended or adjusted under 35 U.S.C. 154(b) by 0 days.

(21) Appl. No.: 18/230,803

(22) Filed: Aug. 7, 2023

(51) Int. Cl.
  *G06F 3/042* (2006.01)
  *G06F 3/01* (2006.01)

(52) U.S. Cl.
  CPC ............ *G06F 3/0426* (2013.01); *G06F 3/011* (2013.01)

(58) Field of Classification Search
  CPC ......... G06F 2203/04809; G06F 3/0426; G06F 3/011
  See application file for complete search history.

(56) References Cited

U.S. PATENT DOCUMENTS

| | | | |
|---|---|---|---|
| 11,631,228 B2 | 4/2023 | Fieldman | |
| 2013/0104065 A1* | 4/2013 | Stecher | G06F 3/04842 715/767 |
| 2014/0274138 A1* | 9/2014 | Chao | G01C 21/206 455/456.3 |
| 2015/0095833 A1* | 4/2015 | Kim | G06F 3/04812 715/773 |
| 2015/0123992 A1* | 5/2015 | Mahan | G06T 11/60 345/629 |
| 2015/0293694 A1* | 10/2015 | Bozzini | G06F 3/0219 715/773 |
| 2020/0125235 A1* | 4/2020 | Eiten | G06F 3/04815 |
| 2020/0401213 A1* | 12/2020 | Roh | G06F 3/011 |
| 2021/0173471 A1* | 6/2021 | Johnson | G06T 19/006 |
| 2023/0315210 A1* | 10/2023 | Ge | G06F 3/04845 345/44 |

* cited by examiner

*Primary Examiner* — Rami R Okasha
(74) *Attorney, Agent, or Firm* — Polsinelli PC

(57) ABSTRACT

A method for displaying a virtual interface to a user in an extended reality environment based on detecting a physical height of the user and adjusting the appearance of the virtual interface displayed to the user in the extended reality environment based on the user's height.

16 Claims, 5 Drawing Sheets

METHOD OF ADJUSTING VIRTUAL KEYBOARDS AND INTERFACES BASED ON USER HEIGHT

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

SUMMARY OF THE INVENTION

Embodiments of the invention provided an improved method and system for users in XR environments, including VR environments such as in the Oculus/Meta Quest platform by Oculus VR (Irvine, CA) (parent company Meta), to provide virtual interfaces, such as virtual keyboards, that adapt to a user's real world physical characteristics, such as height, for making the virtual interface easier to use in the XR environment. It will be appreciated that the systems and methods, including related displays, user interfaces, controls and functionalities, disclosed herein may be similarly implemented on other XR platforms with other XR SDKs and software development tools known to XR developers.

DETAILED DESCRIPTION

Figure 1A:
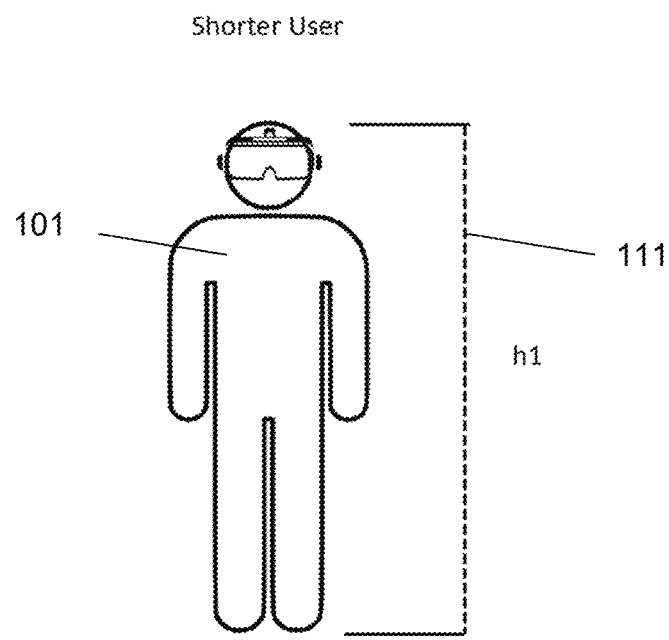
FIGS. 1A and 1B are respective schematic diagrams illustrating a shorter user (FIG. 1A) having a shorter than average height (h1) and a taller user (FIG. 1B) having a taller than average height (h2) in an embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR or extended reality (XR) platforms with other VR SDKs and software development tools known to VR developers.

Embodiments of the invention are described with reference to a virtual keyboard interface with which a user, typically through an avatar that provides a virtual body, hands and the like of the user, interacts to provide text and other inputs into the XR environment and platform. However, it will be appreciated that inventions disclosed herein relative to virtual keyboard interface may include similar functionality for other interfaces that are not just keyboards with virtual keys. For example, an interface capable of being curved in an XR environment could include different shapes for input-receiving selectable regions of the interface, such as buttons or keys, switches, icons or similar activatable regions linked to launching applications and settings and menus and the like. Accordingly, specific reference to a virtual keyboard interface should be understood as one embodiment of the invention that encompasses other interfaces that can be seen and adjusted for use by user's according to their physical characteristics, like height.

Figure 1B:
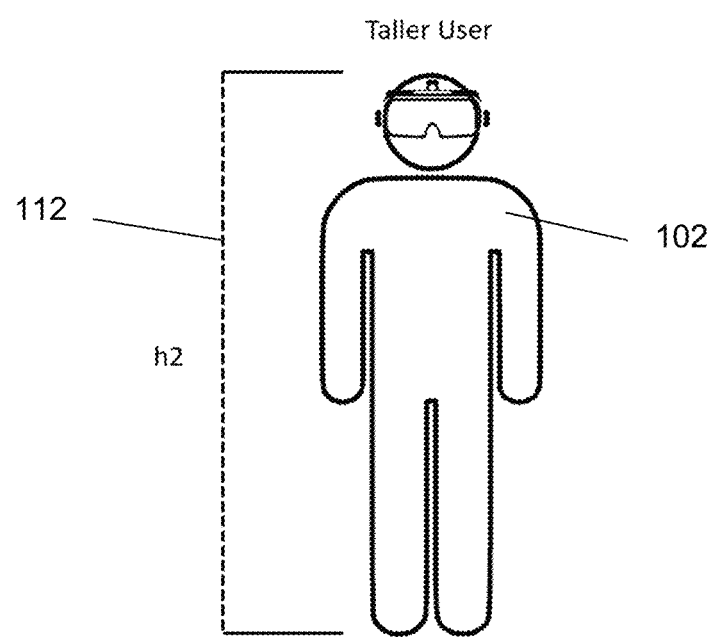
Figure 2:
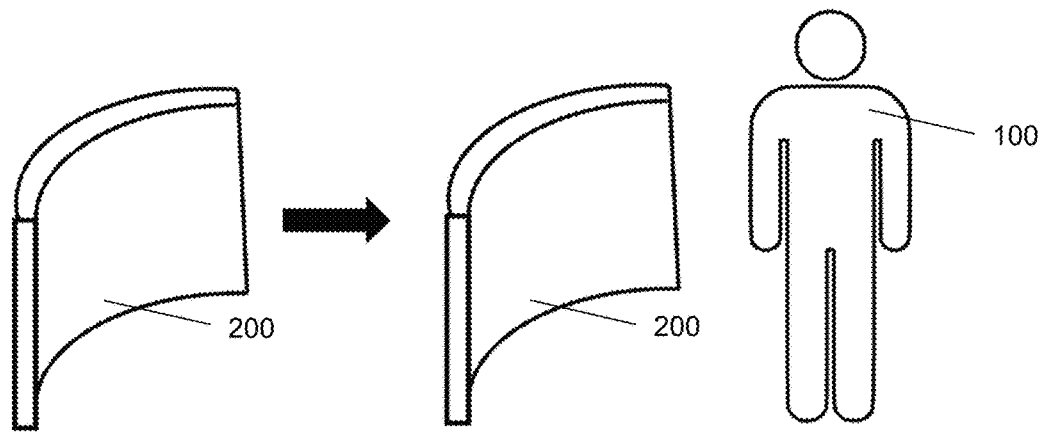
FIG. 2 is a schematic diagram illustrating a curved virtual keyboard interface moving closer to a user in an embodiment of the invention.
Figure 9:
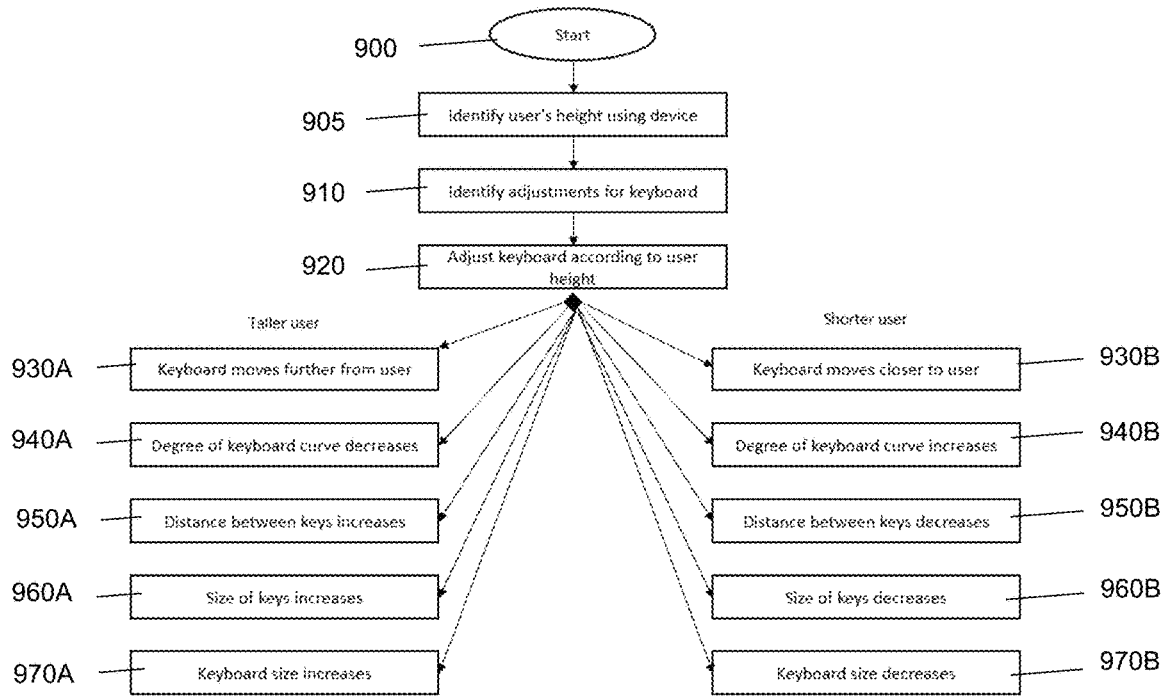
FIG. 9 is a flow diagram illustrating the steps for determining a user's height in an XR environment and adjusting a virtual keyboard interface based on the height of the user in an embodiment of the invention.

Referring to FIG. 9 and with reference to FIGS. 1A, 1B and 2, a method for personalizing an interface, such as a virtual keyboard interface, to a user 100 in an XR environment begins at step 900 "Start". The method is implemented with software and hardware of a respective XR platform. Preferably a user 100 in the real world is using an XR device, such as wearing a VR headset or VR glasses with a display, computer processor, cameras, accelerometer, location sensors and like hardware that is operatively connected to the XR platform.

XR device comprises one or more network interfaces (e.g., wired, wireless, PLC, etc.), at least one processor, and a memory interconnected by a system bus 150, as well as a power supply (e.g., battery, plug-in adapter, solar power, etc.). XR device can further include a display for display of the XR environment, where display can include a virtual reality display of a VR headset. Further, XR device can include input device(s), which can include audio input devices and orientation/inertial measurement devices. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device and need not be self-contained on the XR device.

Network interface(s) include the mechanical, electrical, and signaling circuitry for communicating data over the communication links coupled to a communication network. Network interfaces are configured to transmit and/or receive data using a variety of different communication protocols. Network interfaces may represent different types of network connections such as wireless and wired (physical) connections. Network interfaces are typically separate from pa ower supply, however it is appreciated that interfaces that support PLC protocols may communicate through power supplies and/or may be an integral component coupled to power supply.

Memory includes a plurality of storage locations that are addressable by processor and network interfaces for storing software programs and data structures associated with the embodiments described herein. In some embodiments, XR device may have limited memory or no memory (e.g., no memory for storage other than for programs/processes operating on the device and associated caches). Memory can include instructions executable by the processor that, when executed by the processor, cause the processor implement aspects of the system and the methods outlined herein.

Processor comprises hardware elements or logic adapted to execute the software programs (e.g., instructions) and manipulate data structures. An operating system, portions of which are typically resident in the memory and executed by the processor, functionally organizes XR device by, inter alia, invoking operations in support of software processes and/or services executing on the device. These software processes and/or services may include Extended Reality (XR) artificial intelligence processes/services, which can include methods and/or implementations of standalone processes and/or modules providing functionality described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

At step 905, a user's physical height is determined, preferably with the XR device. For example, it will be appreciated that VR headsets can be calibrated with respect to a floor that a user is standing and then the height of the user can be determined relative to the floor when location sensors of the headset device are lifted on the user's head to a standing height. In other embodiments a user can input their height and/or could have a profile with their height previously saved in memory of the XR platform. As shown in FIGS. 1A and 1B, a shorter than average user 101, wherein an average user height can be a predetermined height or height range, has a height (h1) 111 while a taller than avers user 102 has a height (h2) 112.

At step 910, the determined height of the user 100 is used by the XR platform to identify adjustments to make to the virtual keyboard interface relative to the user. FIG. 2 illustrates an example adjustment of a curved VR keyboard interface 200 being moved to appear closer to a user in an XR environment, i.e., adjustment is moving the interface from a more distant position to a closer position so as to provide a better view and distance for a user to reach the interface.

At step 920, a VR curved keyboard interface 200 is adjusted according to the height of a user 100 determined at step 905. For a taller user 102, one or more of steps 930A-970A are undertaken, while one or more of steps 930B-970B are undertaken for a shorter user 101. In some embodiments, users can be categorized as "average", "shorter" and "taller" based on predetermined heights or ranges of heights for each category. The adjustments to an interface, such as a VR curved keyboard interface 200, could be made to apply appearance adjustments to the interface that are based on three (3) sets of settings for the three (3) categories-AVERAGE, SHORTER and TALLER. In other embodiments, specific adjustments can provide greater levels of personalization where each individual height of a user is processed through an algorithm assigned to each adjustment setting so that each adjustment is more specific to each individual user's height.

If a taller user 102 is determined by the XR platform, at step 930A a VR keyboard interface, including curved and non-curved interfaces, will move to appear further away from the user 100 than an average or default position of the interface. If a shorter user 102 is determined by the XR platform, at step 930B a VR keyboard interface, including curved and non-curved interfaces, will move to appear closer to the user 100 than an average or default position of the interface (see e.g. FIG. 2).

Figure 3A:
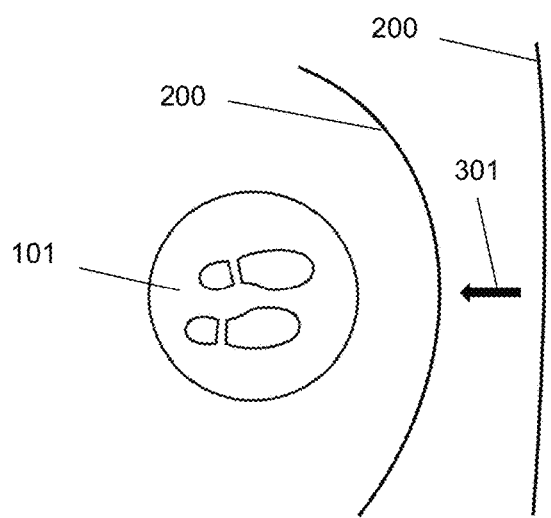
FIG. 3A is a schematic diagram illustrating a virtual keyboard interface moving toward a shorter user as the virtual keyboard interface becomes more curved relative to the user in an embodiment of the invention.
Figure 3B:
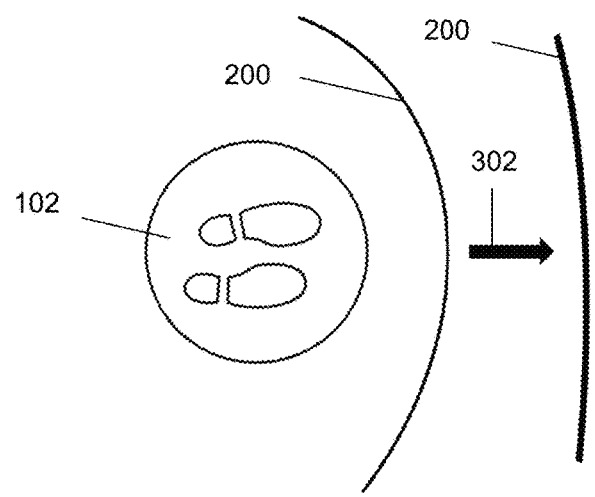
FIG. 3B is a schematic diagram illustrating a virtual keyboard interface moving away from a taller user as the virtual keyboard interface becomes less curved relative to the user in an embodiment of the invention.

With continuing reference to FIG. 9, and further reference to FIGS. 3A and 3B, if a taller user 102 is determined by the XR platform, at step 940A a VR curved keyboard interface 200, will appear to have a smaller degree of curve (i.e. flatter curvature as degree of curve decreased) for the user 100 than an average or default degree of curvature of the interface (FIG. 3B). If a shorter user 102 is determined by the XR platform, at step 940B a curved VR keyboard interface 200 will appear to have a greater degree of curve (i.e. degree of curve increases to wrap more closely around the user in the XR environment) for the user 100 than an average or default degree of curvature of the interface (FIG. 3A).

Figure 4A:
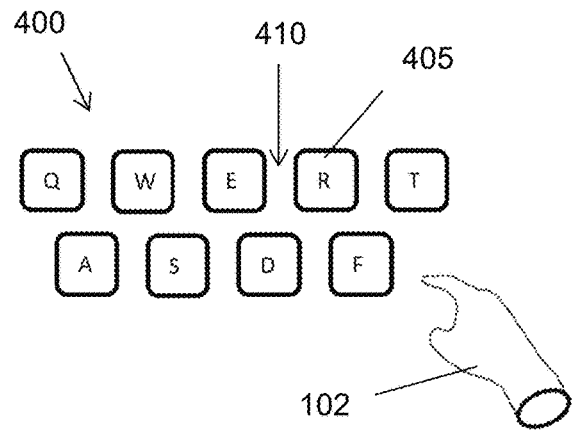
FIG. 4A is a schematic diagram illustrating a virtual hand of a taller user interacting with virtual keys of virtual keyboard interface depicting more spacing separation between the virtual keys in an embodiment of the invention.
Figure 4B:
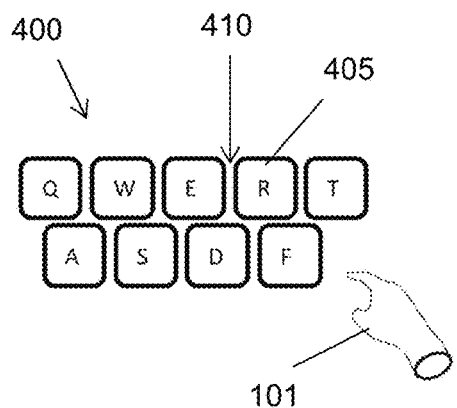
FIG. 4B is a schematic diagram illustrating a virtual hand of a shorter user interacting with virtual keys of virtual keyboard interface depicting less spacing separation between the virtual keys in an embodiment of the invention.

With additional reference to FIGS. 4A and 4B, at step 950A the distances or spacing 410 between virtual keys 405 of a virtual keyboard interface 400, including curved and non-curved interfaces, for a taller user 102 can increase (FIG. 4A), while at step 950B the distances or spacing 410 between virtual keys 405 of a virtual keyboard interface 400, including curved and non-curved interfaces, for a shorter user 101 can decrease (FIG. 4B). The increased spacing for a taller user, preferably with the interface also appearing further away for the user, helps accommodate the longer arms, hands and fingers of the taller user since they can more easily reach further spaced out keys 405. The decreased spacing for a shorter user, preferably with interface also appearing closer to the user, with shorter arms, hands and fingers, helps the shorter user to more easily reach keys 405 that are closer one another.

Figure 5A:
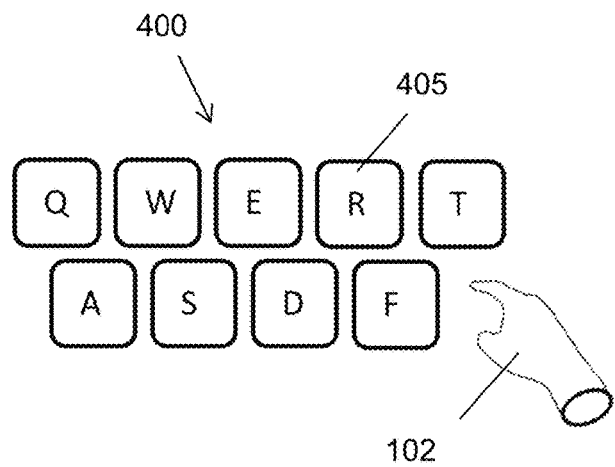
FIG. 5A is a schematic diagram illustrating a virtual hand of a taller user interacting with virtual keys of virtual keyboard interface depicting larger keys and more spacing separation between the virtual keys in an embodiment of the invention.
Figure 5B:
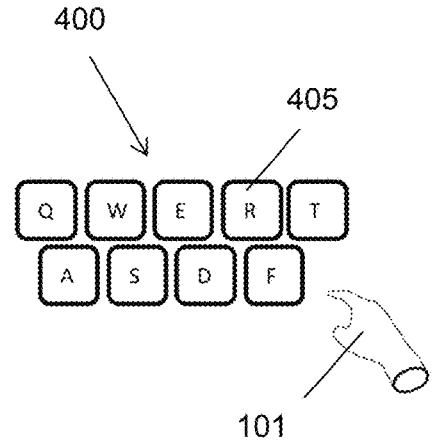
FIG. 5B is a schematic diagram illustrating a virtual hand of a shorter user interacting with virtual keys of virtual keyboard interface depicting smaller keys and less spacing separation between the virtual keys in an embodiment of the invention.

Referencing FIGS. 5A and 5B with FIG. 9, at step 960A the size of virtual keys 405 of a virtual keyboard interface 400, including curved and non-curved interfaces, for a taller user 102 can increase (FIG. 5A), while at step 960B the size of virtual keys 405 of a virtual keyboard interface 400, including curved and non-curved interfaces, for a shorter user 101 can decrease (FIG. 4B). The increased size of keys for a taller user, preferably with the interface also appearing further away for the user, helps accommodate the longer arms, hands and fingers of the taller user since they can more easily reach larger and further away keys 405. Further, step 970A the overall size of the keyboard or virtual interface is increased since the taller user can more easily reach different keys or areas of the larger virtual interface. The decreased size of keys for a shorter user, preferably with interface also appearing closer to the user, with shorter arms, hands and fingers, helps the shorter user to more easily reach smaller keys 405 and also provides a virtual keyboard or interface of reduced overall size (which the shorter user can reach different keys and areas more easily on the overall smaller interface) as illustrated at step 970B.

Figure 6:
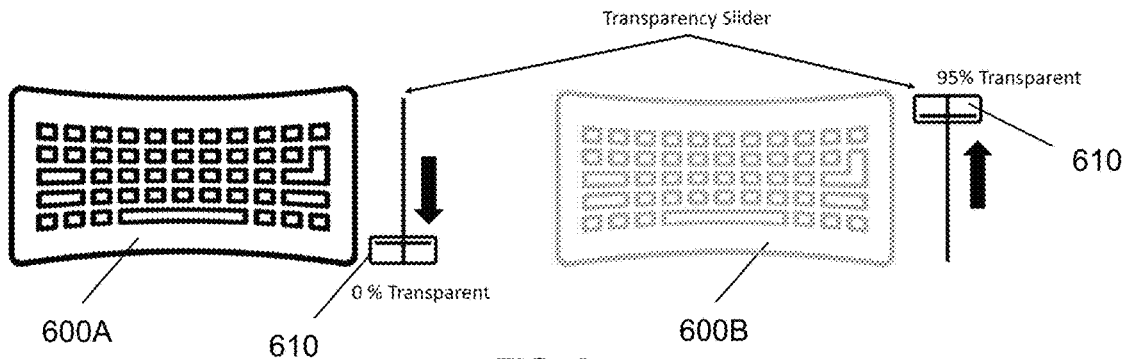
FIG. 6 is schematic diagram illustrating a virtual transparency interface that controls level of transparency of a virtual keyboard interface in an embodiment of the invention.
Figure 7:
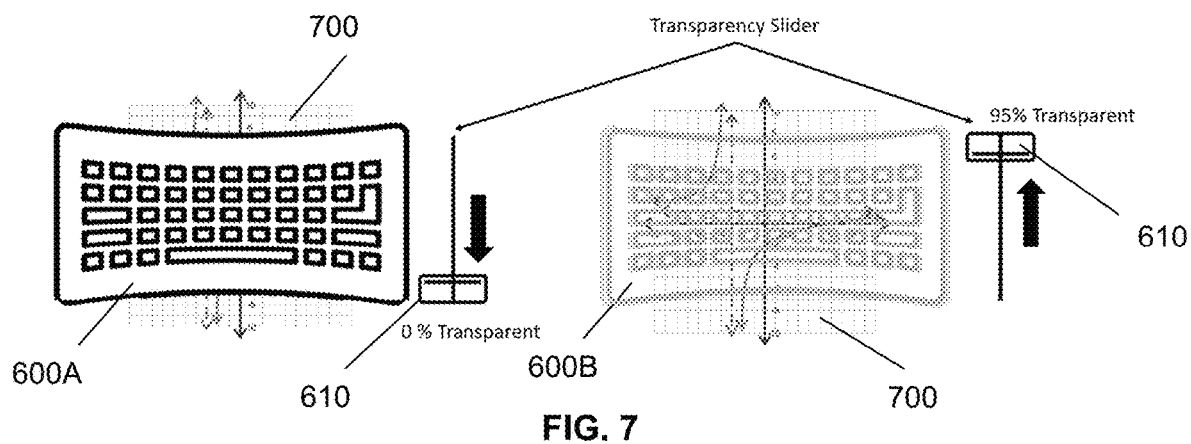
FIG. 7 is schematic diagram illustrating a virtual transparency interface that controls level of transparency of a virtual keyboard interface with an underlying virtual graph in an embodiment of the invention.
Figure 8:
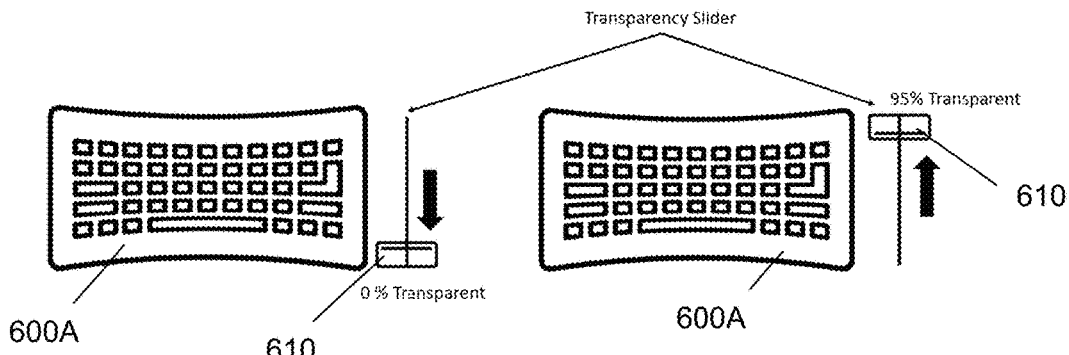
FIG. 8 is schematic diagram illustrating a virtual transparency interface that controls level of transparency of a virtual keyboard interface with an override of transparency if there is no underlying virtual material in an embodiment of the invention.
Figure 10:
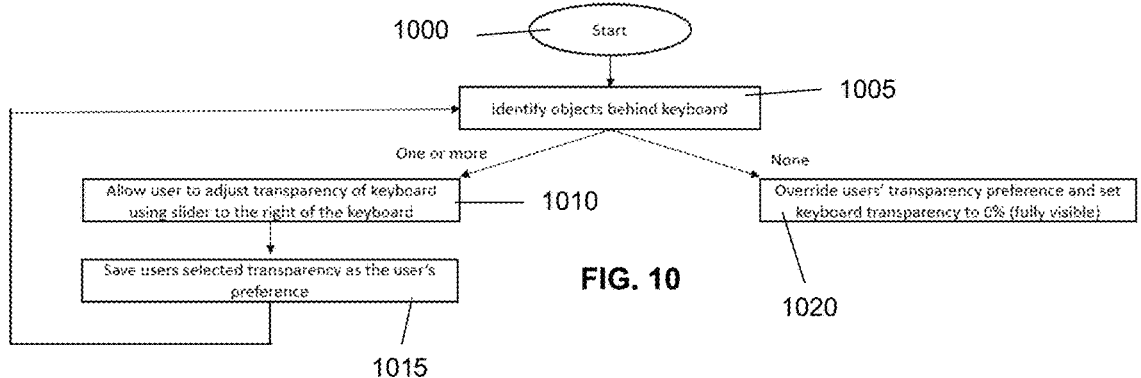
FIG. 10 is a flow diagram illustrating the steps for adjusting transparency of virtual keyboard interface in an XR environment in an embodiment of the invention.

Referring to FIG. 10, and further reference to FIGS. 6-8, in embodiments a transparency control for a virtual interface, such as a virtual keyboard interface, can be provided to allow a user to render the interface with transparency that is most suitable to seeing the surrounding XR environment while also using the interface. As shown in FIG. 6, a transparency control interface 610, such as a transparency slider, can be controlled by a user in the XR environment to vary the level of transparency of virtual interface, like fully visible VR keyboard interface 600A at 0% transparency level (no transparency), or almost fully transparent interface 600B at 95% transparency level (faintly visible). Intermediate levels of transparency of the keyboard interface result as the transparency control is adjusted, such as sliding up or down. In some embodiments, it is preferable to include a maximum transparency that is less than 100% and not render full invisibility of the interface.

The method steps shown in FIG. 10 being with "Start" step 1000 and may be more fully understood with reference to FIGS. 7 and 8. At step 1005, the XR platform determines if a virtual interface, such as virtual keyboard 600A/600B, includes an object or other visible material, such as graph 700, behind the interface. If no object is determined behind the interface at step 1020, the transparency level can be overridden by the XR platform to provide a fully transparent keyboard 610A even if the user adjusts the transparency interface 610 to different levels as shown in FIG. 8.

If one or more objects, such as graph 700 (FIG. 7) are determined as behind the keyboard interface 600A (FIG. 7), at step 1010 the XR platforms enables the transparency control interface 610 for the user to set a level of transparency that the user determines provides the best visual balance to see the virtual keyboard interface and also the underlying object, such as graph 700. In one embodiment, the XR platform may at step 1015 also detect and save the settings of the user's preferred transparency level based on the type of object or other criteria so that such saved transparency level (or levels if different and saved for different objects) is automatically provided to the user when the user encounters a similar overlap of the interface and an object in the XR environment. In some embodiments, the user may also provide inputs (such as control inputs to settings interface in the XR environment, audio inputs, profile inputs and the like) that prompt the XR platform to save the user's transparency level preferences.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for displaying a virtual keyboard to a user in an extended reality environment comprising:

detecting a physical height of a user using an extended reality environment via an extended reality hardware device;

adjusting the appearance of a virtual keyboard displayed to the user in the extended reality environment from a default appearance of the virtual keyboard based on the physical height of the user, wherein the virtual keyboard includes a plurality of virtual keys; and detecting the physical height of the user is shorter than a predetermined physical height and adjusting the appearance of the virtual keyboard displaying the keys to appear closer to one another to the user than a default appearance distance between keys for users detected with the predetermined physical height and to appear smaller than a default appearance of size of keys of a default virtual keyboard for users detected with the predetermined physical height.

2. The method of claim 1, wherein the virtual keyboard is curved.

3. The method of claim 1, further comprising detecting the physical height of the user is shorter than a predetermined physical height and adjusting the appearance of the virtual keyboard to appear at a closer distance to the user than a default appearance distance of a default virtual keyboard for users detected with the predetermined physical height.

4. The method of claim 1, further comprising detecting the physical height of the user is shorter than a predetermined physical height and adjusting the appearance of the virtual keyboard to appear to have a greater degree of curvature to the user than a default appearance of curvature of a default virtual keyboard for users detected with the predetermined physical height.

5. The method of claim 1, further comprising detecting the physical height of the user is shorter than a predetermined physical height and also adjusting the appearance of the virtual keyboard with additional adjustments including:

displaying the virtual keyboard to appear at a closer distance to the user than a default appearance distance of a default virtual keyboard for users detected with the predetermined physical height; and displaying the virtual keyboard to appear to have a greater degree of curvature to the user than a default appearance of curvature of a default virtual keyboard for users detected with the predetermined physical height.

6. The method of claim 1, further comprising:

displaying a transparency interface to the user in the extended reality environment;

adjusting the transparency of the virtual keyboard in response to receiving control input to the transparency interface; and storing a user's selected level of transparency based on a displayed object underlying the virtual keyboard.

7. The method of claim 6, further comprising subsequently detecting the same displayed object underlying the virtual keyboard and automatically applying the user's selected level of transparency previously stored to the virtual keyboard.

8. The method of claim 1, further comprising:

displaying a transparency interface to the user in the extended reality environment;

detecting that no virtual object is underlying the virtual keyboard; and maintaining full visibility of the virtual keyboard regardless of the user's interaction with the transparency interface.

9. A method for displaying a virtual keyboard to a user in an extended reality environment comprising:

detecting a physical height of a user using an extended reality environment via an extended reality hardware device; adjusting the appearance of a virtual keyboard displayed to the user in the extended reality environment from a default appearance of the virtual keyboard based on the physical height of the user, wherein the virtual keyboard includes a plurality of virtual keys; and detecting the physical height of the user is taller than a predetermined physical height and adjusting the appearance of the virtual keyboard displaying the keys to appear further apart from one another to the user than a default appearance distance between keys for users detected with the predetermined physical height and to appear larger than a default appearance of size of keys of a default virtual keyboard for users detected with the predetermined physical height.

10. The method of claim 9, wherein the virtual keyboard is curved.

11. The method of claim 9, further comprising detecting the physical height of the user is taller than a predetermined physical height and adjusting the appearance of the virtual keyboard to appear at a further distance to the user than a default appearance distance of a default virtual keyboard for users detected with the predetermined physical height.

12. The method of claim 11, further comprising detecting the physical height of the user is taller than a predetermined physical height and adjusting the appearance of the virtual keyboard to appear to have a flatter degree of curvature to the user than a default appearance of curvature of a default virtual keyboard for users detected with the predetermined physical height.

13. The method of claim 9, further comprising detecting the physical height of the user is taller than a predetermined physical height and adjusting the appearance of the virtual keyboard to appear to have a greater flatter degree of curvature to the user than a default appearance of curvature of a default virtual keyboard for users detected with the predetermined physical height.

14. The method of claim 9, further comprising:

displaying a transparency interface to the user in the extended reality environment;

adjusting the transparency of the virtual keyboard in response to receiving control input to the transparency interface; and storing a user's selected level of transparency based on a displayed object underlying the virtual keyboard.

15. The method of claim 14, further comprising subsequently detecting the same displayed object underlying the virtual keyboard and automatically applying the user's selected level of transparency previously stored to the virtual keyboard.

16. The method of claim 9, further comprising:

displaying a transparency interface to the user in the extended reality environment;

detecting that no virtual object is underlying the virtual keyboard; and maintaining full visibility of the virtual keyboard regardless of the user's interaction with the transparency interface.

* * * * *